A. C. SAXTON.
LOCK FOR CONTROLLING LEVERS.
APPLICATION FILED APR. 27, 1918.

1,437,555.

Patented Dec. 5, 1922.

Inventor
Augustus C. Saxton

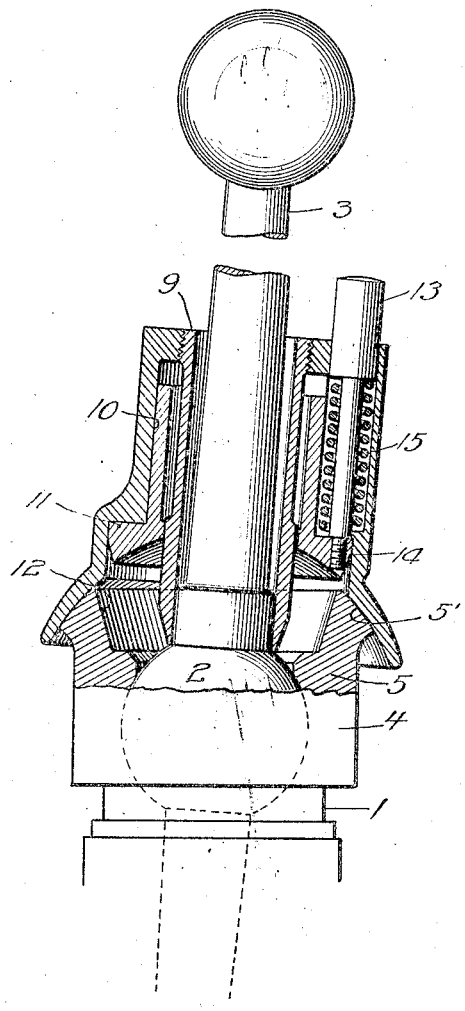

Patented Dec. 5, 1922.

1,437,555

UNITED STATES PATENT OFFICE.

AUGUSTUS C. SAXTON, OF CHICAGO, ILLINOIS, ASSIGNOR TO H. R. MANUFACTURING COMPANY, OF CHICAGO, ILLINOIS, A CORPORATION OF ILLINOIS.

LOCK FOR CONTROLLING LEVERS.

Application filed April 27, 1918. Serial No. 231,089.

*To all whom it may concern:*

Be it known that I, AUGUSTUS C. SAXTON, a citizen of the United States, residing at Chicago, Illinois, have invented certain new and useful Improvements in Locks for Controlling Levers, of which the following is a specification.

This invention relates to locks for controlling levers, and is so designed as to provide a housing and dust cap for the transmission casing.

It is a further object of the invention to provide such a lock which can be readily and quickly applied to controlling levers, which will be more secure and simple in operation.

The above and other features of advantages and capabilities will become apparent from a detailed description of the accompanying drawings, in which I have illustrated one form of lock embodying the invention, but the construction there shown is to be understood as illustrative only and not as defining the limits of my invention.

In the drawings:—

Fig. 3 is a sectional view taken on the line 3—3, Fig. 2.

Figure 1:
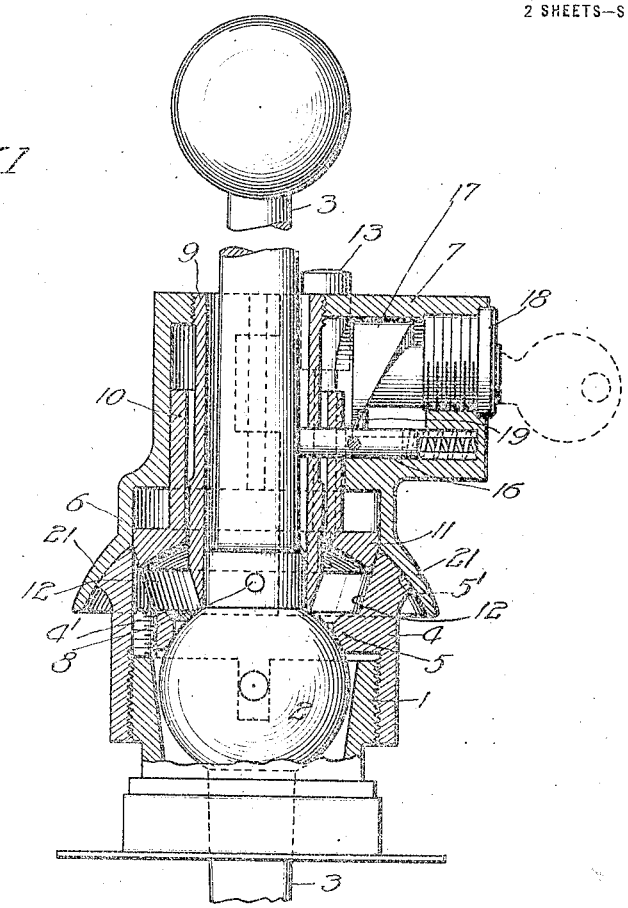
Fig. 1 is a sectional elevation of a lock embodying one form of my invention taken on the line 1—1, Fig. 2.

Referring to the drawings in detail: 1 represents in general the transmission casing, with a spherical bearing, in which is mounted the ball 2 of the controlling lever 3, the lever being passed upwardly through the transmission casing and supported upon the casing. Screwed to the casing 1 is a retaining ring 4, which is connected by means of a fillister screw 4' to the casing 1, and is provided with an inwardly extending bevelled rim 5 designed to engage the ball 2 of the control lever 3, which prevents the upward movement thereof, as best shown in Fig. 1, and is provided in its upper portion with a conical socket, and at the upper end with an enlarged bevelled bearing 5' for the dust cap 6, which cap is formed integrally with the lock carrying case, indicated as a whole by the reference character 7.

Rigidly fixed to the lever 3 by means of a pin 8 is a sleeve 9, which sleeve at its upper end is screw threaded into the casing 7. Slidably mounted on the sleeve 9 is a sleeve 10 having at its lower end an integrally formed locking disc 11, adapted to fit into the socket 12 in the retaining ring 4, for the purpose of locking the lever against movement in any direction. Mounted in the casing 7 is a spring pressed plunger 13, which is at its lower end screwed into the disc 11, as best shown at 14, Fig. 3. The plunger 13 is positioned in a bore in the casing, and is surrounded by the compression spring 15 which exerts a constant upwardly pressure thereon, and is designed to automatically lift the disc 12 to unlocked position when the spring pressed plunger 16 is withdrawn, by means of the cam 17, which is controlled by the tumbler key lock 18. The sleeve 10 is provided with an opening which when the disc is moved down to unlocking position registers with the spring pressed plunger 16, by means of which the disc is held in locked position. In other words, when the disc 11 is in its normal position, that is, unlocked position, the spring pressed plunger 16 is exerting a constant pressure inwardly, so that the moment the opening in the sleeve registers with the plunger, the plunger is automatically driven through the opening, by virtue of which the disc is held in locked position.

When it is desired to unlock the device the key is inserted in the lock 18 and turned partially around, so that the cam 17, which cooperates with the pin 19 and the plunger 16, withdraws the plunger out of engagement with the opening in the sleeve 10, when the compression spring 15 forces the plunger 13 upwardly, withdrawing with it the disc 11 out of locked position.

Figure 2:
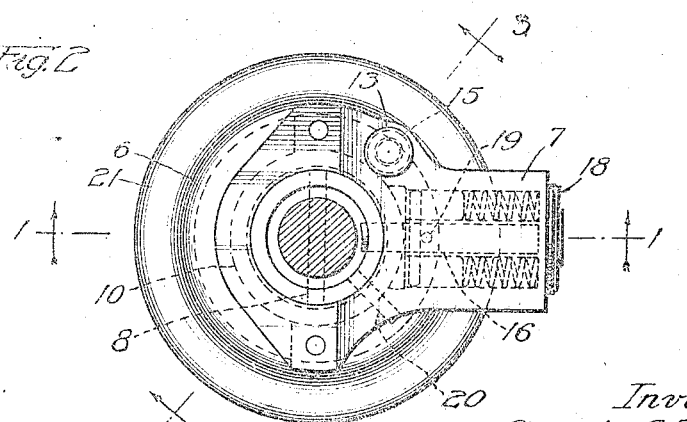
Fig. 2 is a plan view of the same.

When it is desired to lock the device, all that is necessary is simply to press downwardly on the plunger by means of the foot or otherwise, until the plunger 16 snaps into the opening in the sleeve 10, in which position it is held until the key is operated for withdrawing the plunger 16 as shown best in Fig. 1 described. The casing 7, in addition to being screw threaded to the sleeve 9, is also connected to the sleeve 9 by means of the pin 20, as best shown in Fig. 2. The casing 7 is provided at its lower end with outwardly and downwardly extending flange 21, which forms a frictional bearing with the bevelled bearing 5' on the retaining ring 4. The casing 7 and retaining ring 4 not only form a housing and dust cap for the transmission, but also provide a smooth working bearing to facilitate the operation of the controlling lever, and assist in properly supporting the same. In this it will be seen that the casing 7, which forms a dust cap and carries the locking mechanism, is fixed stationary to the lever 3.

It will also be seen that by means of the construction described, through the arrangement of the sleeve 9, the locking device can be quickly and properly applied to controlling levers without the necessity of grinding or forming it exactly to fit the controlling lever. This is of great importance in view of the slight variations in different controlling levers.

When the plunger 13 has been pushed downwardly (the key, of course, being removed) the bolt 16 automatically snaps into the opening in the sleeve 10, absolutely locking the lever, in which position it is held until the key is inserted and momentarily turned, when the bolt is automatically retracted, the spring 15 then goes into operation to automatically raise the locking disc 11. The only time that it is necessary to use the key is when it is desired to unlock the device, so that the operator or driver is not inconvenienced by being obliged to use the key when locking the device, but merely press on the plunger when his car is brought to a stop, and thus lock the device.

Having now described my invention, I claim:—

1. A lock for controlling levers, comprising a mounting for the control lever having a socket in its upper end, and a non-slidable casing on the control lever, provided with integral means at its lower end designed to co-operate with said mounting for forming a dust cap for the transmission, a slidable locking element in the casing, a longitudinally reciprocable plunger extending through the end wall of said casing and substantially parallel with the axis of the locking element for moving said locking element into locking position, a key controlled lock automatically holding said locking element in locked position, and means for automatically returning said locking element to unlocked position when said key controlled lock is operated.

2. In a device of the character specified, a supporting member for a gear shift lever, a cap non-rotatably secured thereto, having a rounded bearing on its upper surface and adapted to retain a gear shift lever in position on said supporting member, a sleeve adapted to be secured to said lever, said sleeve having detachably secured thereon a lock carrying sleeve, between which and the first mentioned sleeve is a locking element adapted to cooperate with the said cap to prevent operative movement of the lever, and operating means for said locking element.

3. A lock for gear shift levers comprising outer, inner and intermediate sleeves, the inner and outer sleeves being detachably secured together at one end and the intermediate sleeve being reciprocable between said inner and outer sleeves within the intermediate space, means for causing rectilinear reciprocation of said intermediate sleeve, comprising a plunger fixed thereto and longitudinally reciprocable through an opening formed in said outer sleeve and in a direction substantially parallel to the axis of the sleeves, and means for locking said intermediate sleeve in one position, said last named means, when in locking position, connecting said inner and outer sleeves to prevent relative rotation thereof.

4. In an automobile lock, the combination of a shift lever, a socket fixed with relation to the fulcrum of said lever, a hood carried by said lever above the socket and movable relatively thereto, a plug mounted in said socket so as to be capable of longitudinal movement but incapable of rotary movement relatively to the socket, a plunger projecting upwardly from said plug through said hood, a spring tending to hold said plug within the confines of the hood and said plunger in projected position above said hood so that by downward pressure of the foot upon said plunger said plug may be projected into said socket to hold said lever against oscillatory movement, and a key-controlled lock including a bolt adapted to be projected through said hood into the path of said plug whereby said plug is locked in depressed position.

In witness whereof, I hereunto subscribe my name to this specification in the presence of two witnesses.

AUGUSTUS C. SAXTON.

Witnesses:
 CLARENCE J. LOFTUS,
 GEORGE S. HILL.